(12) United States Patent
Matsuo et al.

(10) Patent No.: US 10,231,231 B2
(45) Date of Patent: Mar. 12, 2019

(54) RADIO SYSTEM, RADIO BASE STATION AND RADIO TERMINAL

(71) Applicant: KABUSHIKI KAISHA TOSHIBA, Minato-ku, Tokyo (JP)

(72) Inventors: Ryoko Matsuo, Tokyo (JP); Tatsuma Hirano, Tokyo (JP); Toshihisa Nabetani, Kawasaki (JP); Tomoko Adachi, Tokyo (JP); Kiyoshi Toshimitsu, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 47 days.

(21) Appl. No.: 14/851,300

(22) Filed: Sep. 11, 2015

(65) Prior Publication Data
US 2016/0007330 A1     Jan. 7, 2016

Related U.S. Application Data

(63) Continuation of application No. 13/930,437, filed on Jun. 28, 2013, now Pat. No. 9,167,600, which is a
(Continued)

(51) Int. Cl.
*H04W 74/04*     (2009.01)
*H04W 72/04*     (2009.01)
(Continued)

(52) U.S. Cl.
CPC ......... *H04W 72/044* (2013.01); *H04W 74/04* (2013.01); *H04W 74/0833* (2013.01); *H04W 88/02* (2013.01); *H04W 88/08* (2013.01)

(58) Field of Classification Search
None
See application file for complete search history.

(56) References Cited

U.S. PATENT DOCUMENTS 7,623,448 B1 * 11/2009 Vrzic ............... H04W 74/02
                                                                     370/230
2005/0111427 A1    5/2005 Li et al.
(Continued)

FOREIGN PATENT DOCUMENTS

EP          1263168        12/2002
JP        2003-052079     2/2003
(Continued)

OTHER PUBLICATIONS

Erdem Ulukan et al., Angular MAC Protocol With Location Based Scheduling for Wireless Ad Hoc Networks, IEEE, May 30, 2005, pp. 1473-1478.
(Continued)

*Primary Examiner* — Gregory B Sefcheck
*Assistant Examiner* — Jenkey Van
(74) *Attorney, Agent, or Firm* — Amin, Turocy & Watson LLP

(57) ABSTRACT

One of a plurality of radio terminals that transmit radio signals to a radio base station under a space multiplexing scheme, including a receiving unit that receives an access right request signal with respect to the radio base station from an other radio terminal, a prevention unit that prevents transmission of radio signals when receiving radio signals directed to an other radio terminal, a cancellation unit that cancels the prevention of transmission when receiving an access right assignment signal during the prevention of transmission and a transmitting unit that transmits a data signal to the radio base station according to the assignment signal, wherein radio signals are transmitted to the radio base station simultaneously with the other radio terminals and under the space multiplexing scheme.

15 Claims, 12 Drawing Sheets

Related U.S. Application Data continuation of application No. 12/441,571, filed on Apr. 1, 2010, now Pat. No. 8,503,357, which is a continuation of application No. PCT/JP2009/051916, filed on Jan. 29, 2009.

(51) Int. Cl.
*H04W 74/08* (2009.01)
*H04W 88/02* (2009.01)
*H04W 88/08* (2009.01)

(56) References Cited

U.S. PATENT DOCUMENTS

| | | | | |
|---|---|---|---|---|
| 2005/0135284 A1* | 6/2005 | Nanda | .................. | H04W 52/383 370/294 |
| 2005/0135317 A1* | 6/2005 | Ware | .................... | H04W 72/005 370/338 |
| 2005/0135410 A1* | 6/2005 | Stephens | ............... | H04W 74/06 370/449 |
| 2005/0141495 A1* | 6/2005 | Lin | ....................... | H04B 7/0617 370/389 |
| 2005/0144307 A1* | 6/2005 | Li | ............................. | H04L 1/16 709/232 |
| 2005/0157695 A1* | 7/2005 | Stephens | ............... | H04W 16/28 370/346 |
| 2007/0002887 A1* | 1/2007 | Benveniste | ........... | H04W 74/00 370/437 |
| 2007/0058605 A1 | 3/2007 | Meylan et al. | | |
| 2008/0112351 A1 | 5/2008 | Surineni et al. | | |
| 2008/0192707 A1* | 8/2008 | Xhafa | ............... | H04W 74/0808 370/336 |
| 2009/0016263 A1* | 1/2009 | Kishigami | ............... | H04B 7/04 370/328 |
| 2010/0008318 A1 | 1/2010 | Wentink et al. | | |
| 2010/0014502 A1* | 1/2010 | Singh | ....................... | H04B 7/12 370/343 |
| 2010/0046453 A1* | 2/2010 | Jones, IV | .......... | H04W 72/0406 370/329 |
| 2010/0074198 A1 | 3/2010 | Morioka | | |

FOREIGN PATENT DOCUMENTS

| | | |
|---|---|---|
| JP | 2004-032035 | 1/2004 |
| JP | 2004-320084 | 11/2004 |
| JP | 2005-039728 | 2/2005 |
| JP | 2006-025335 | 1/2006 |
| JP | 2007-208522 | 8/2007 |
| WO | 2005053235 | 6/2005 |
| WO | 2009119160 | 10/2009 |

OTHER PUBLICATIONS

International Search Report for PCT/JP2009/051916 dated Jun. 12, 2009.

Anonymous ED, IEEE Standard for Information Technology-Telecommunications and Information Exchange Between Systems-Local and Metropolitan Area Networks-Specific Requirements, Jun. 12, 2007 pp. 1-1184.

Japanese Office Action for Japanese Application No. 2008-087988 dated Apr. 9, 2012.

U.S Office Action dated Oct. 3, 2014 corresponding to U.S. Appl. No. 13/930,437, filed Jun. 28, 2013.

* cited by examiner

TERMINALS OF SAME SDMA GROUP
TERMINALS OF SDMA GROUP DIFFERENT FROM STA1, 2, 3

| Frame Control | Duration | RA | TA | SDMA Priod | FCS |

RTS frame

| Frame Control | Duration | RA | SDMA Priod | FCS |

CTS frame

US 10,231,231 B2

RADIO SYSTEM, RADIO BASE STATION AND RADIO TERMINAL

CROSS REFERENCE TO RELATED APPLICATIONS

This application is a Continuation of co-pending U.S. patent application Ser. No. 13/930,437, filed on Jun. 28, 2013, which is a Continuation of U.S. patent application Ser. No. 12/441,571, filed on Mar. 17, 2009, which is a Continuation of PCT International Application No. PCT/JP2009/051916 filed on Jan. 29, 2009, the entire contents of both of which are incorporated herein by reference.

This application claims benefit of priority under 35 USC § 119 to Japanese Patent Application No. 2008-87988 filed on Mar. 28, 2008, the entire contents of which are incorporated herein by reference.

TECHNICAL FIELD

The present invention relates to a radio system, radio base station and radio terminal.

BACKGROUND ART

In frequency bands of 2.4 GHz and 5 GHz, wireless LAN systems compliant the IEEE802.11 standard using a frequency band of 20 MHz are becoming widespread at an accelerating pace. The IEEE802.11 standard (IEEE802.11a/b/g) which has already been put to practical use adopts an access scheme of CSMA/CA (carrier sense multiple access with collision avoidance).

Furthermore, the Task Group n (TGn) is engaged in new standardization activities aiming at the achievement of throughput of 100 Mbps or higher and is studying, for example, a MIMO (Multi Input Multi Output) technique that carries out communication using a plurality of antennas and an aggregation technique that aggregates a plurality of packets into one packet to be transmitted/received in a MAC layer.

The activities intended to speed up communication of wireless LAN systems are believed to continue, and in practice, an IEEE802.11 standardization conference as a study group has started to study on the further speed enhancement and improvement of the system capacity of wireless LAN systems.

As one of schemes leading to the improvement of system capacity of a wireless LAN system, there is known a Space Division Multiple Access (SDMA) scheme, that is, a scheme whereby data is transmitted/received between a radio base station and a plurality of radio terminals simultaneously and at the same frequency (spatially multiplexed) (e.g., JP-A 2003-52079 (Kokai)).

When a wireless LAN system is constructed by adopting this SDMA scheme and the CSMA/CA access scheme adopted in the IEEE802.11 standard, there can be a situation in which a radio base station cannot spatially separate packets, which are spatially multiplexed and transmitted, from a plurality of radio terminals and cannot receive packets.

When, for example, the radio base station transmits data packets of different packet lengths spatially multiplexed to the plurality of radio terminals, since response packets are sent back from the respective radio terminals at different timings and this results in interference. If the radio base station is assumed to transmit the next data packet after a lapse of a predetermined time after the reception of the response packets, the radio base station transmits the next data packet and receives the response packets simultaneously, and this also results in interference (collision).

In order to solve these problems, studies are underway on methods for preventing the radio base station from transmitting data packets and receiving response packets simultaneously.

There are disclosed, for example, a method whereby packets are multiplexed and transmitted from a radio base station to a plurality of radio terminals (over a downlink) at the same packet transmission timing and its period (e.g., JP-A 2005-39728 (Kokai)) and a method whereby packets are multiplexed and transmitted from a plurality of radio terminals to a radio base station (over an uplink) at the same packet transmission timing and its period (e.g., JP-A 2003-52079 (Kokai)).

Furthermore, there is also disclosed a method of identifying a group of a plurality of radio terminals capable of multiplexing and transmitting packets to a radio base station under an SDMA scheme (e.g., JP-A 2007-208522 (Kokai)).

The IEEE802.11 standard defines a mechanism whereby when a radio communication apparatus (including a radio base station, radio terminal) receives a packet directed to another radio communication apparatus, a NAV (Network Allocate Vector) is set so as to prevent transmission of packets for a certain period of time.

Therefore, when constructing a wireless LAN system compliant with the IEEE802.11 standard and adopting an SDMA scheme, it is necessary to take into consideration that the radio communication apparatus which has received a packet directed to the other radio communication apparatus prevents transmission of the packet for a certain period of time. However, e.g., JP-A 2003-52079 (Kokai), JP-A 2005-39728 (Kokai) and JP-A 2007-208522 (Kokai) do not take into consideration, when constructing a wireless LAN system adopting an SDMA scheme, that the radio communication apparatus which has received a packet directed to the other radio communication apparatus prevents transmission of the packet for a certain period of time.

Furthermore, the IEEE802.11e standard defines a period (TXOP (Transmission Opportunity) period) during which packets are transmitted/received continuously without relinquishing a transmission access right and allows a plurality of packets to be transmitted continuously within the TXOP period.

That is, radio communication apparatuses compliant with the IEEE802.11e standard can transmit a packet within a TXOP period, receive a response packet to the packet and then transmit packets continuously without acquiring any transmission access right again after a lapse of a predetermined time (e.g., time interval between packets defined by the IEEE802.11 standard MAC protocol specification (SIFS: Short Inter Frame Space)).

However, the wireless LAN system compliant with the IEEE802.11 standard and adopting an SDMA scheme does not consider the method whereby a plurality of radio terminals spatially multiplex and transmit packets to the radio base station and continuously transmit packets within the TXOP period.

DISCLOSURE OF THE INVENTION

According to an aspect of the present invention, there is provided with a radio system having a first radio terminal, a second radio terminal and a base station, in which the first radio terminal and the second radio terminal transmit radio signals to the radio base station under a space multiplexing scheme, the first radio terminal comprising a first transmitting unit configured to transmit a request signal to the radio base station for requesting an access right to transmit radio signals to the radio base station, the second radio terminal comprising a prevention unit configured to prevent transmission of radio signals for predetermined duration when receiving radio signals other than those directed to the second radio terminal, the radio base station comprising:

a receiving unit configured to receive the request signal from the first radio terminal;

a storage configured to store an identifier of a radio terminal which can transmit radio signals to the radio base station under the space multiplexing scheme in association with the first radio terminal; and a second transmitting unit configured to transmit an assignment signal for assigning an access right to transmit radio signals to the radio base station to not only the first radio terminal which is a sender of the request signal, but also the second radio terminal when an identifier of the second radio terminal is stored in association with the first radio terminal in the storage, wherein the first radio terminal transmits radio signals according to the assignment signal, the second radio terminal cancels the prevention of transmission of radio signals according to the assignment signal to transmit radio signals even when transmission of radio signals is prevented according to receiving of the request signal directed to the radio base station, and a period during which the first radio terminal transmits the radio signals to the radio base station at least partially overlaps a period during which the second radio terminal transmits the radio signals to the radio base station.

BEST MODE FOR CARRYING OUT THE INVENTION

Hereinafter, embodiments of the present invention will be explained.

(First Embodiment)

Figure 1:
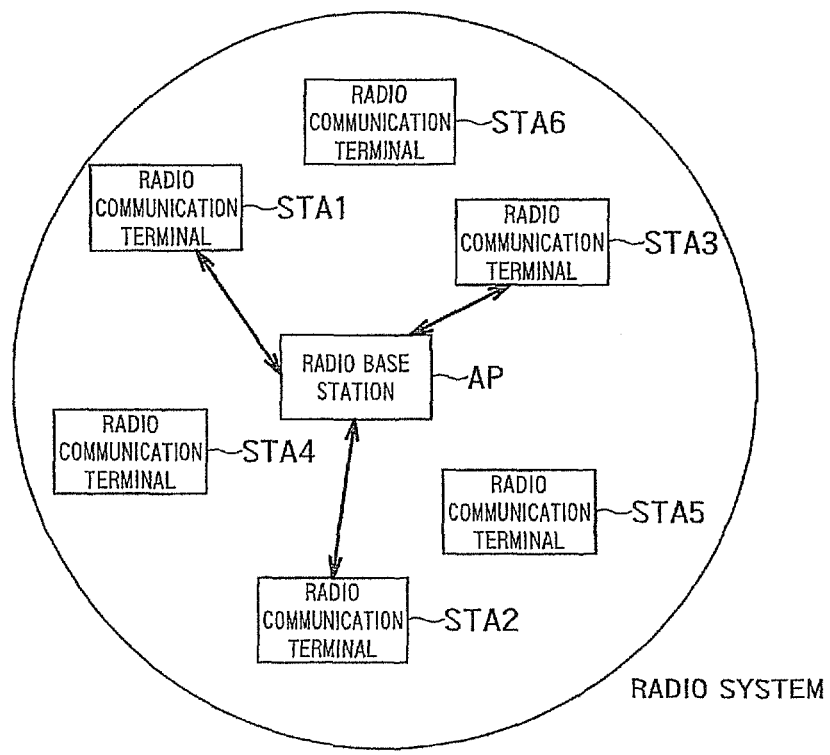
FIG. 1 shows a radio system according to a first embodiment of the present invention.

FIG. 1 shows a radio system according to a first embodiment of the present invention. This radio system is constructed in compliance with the IEEE802.11 standard.

The radio system according to the first embodiment is provided with radio terminals STA1 to STA6 and a radio base station AP. The radio terminals STA1 to STA6 and the radio base station AP mutually transmit/receive radio signals via radio channels. The radio base station AP behaves as an access point. FIG. 1 shows a situation in which the radio base station AP transmits/receives radio signals to/from the radio terminals STA1 to STA3 under a space multiplexing scheme simultaneously and using the same frequency channel.

Figure 2:
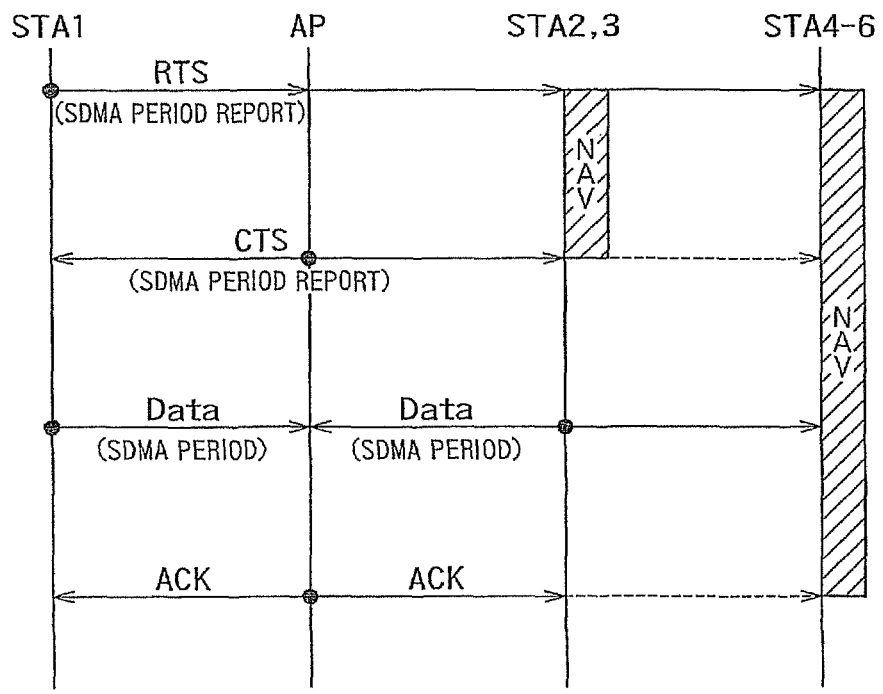
FIG. 2 is a time chart showing radio signals transmitted/received between a radio base station and a radio terminal.
Figures 3, 4:
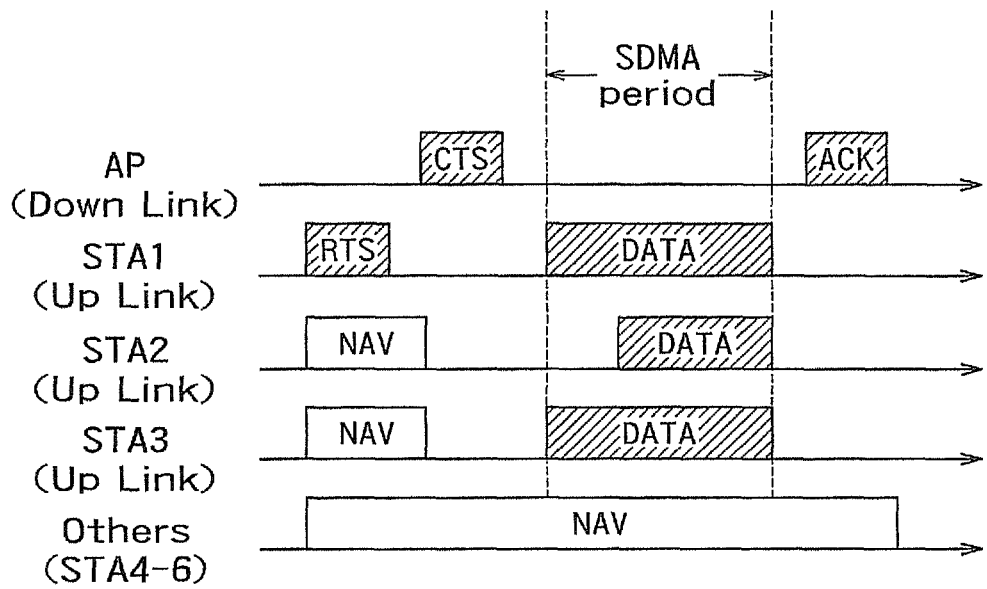
FIG. 3 is a time chart showing radio signals transmitted/received between a radio base station and a radio terminal.
FIG. 4 shows packet configurations of an RTS packet and a CTS packet.

When the radio terminals STA1 to STA3 simultaneously transmit radio signals to the radio base station AP under a space multiplexing scheme, FIGS. 2 and 3 are time charts showing the radio signals transmitted/received between the radio terminals STA1 to STA3 and the radio base station AP.

First, suppose the radio terminal STA1 has acquired a transmission right after a back-off period. The radio terminal STA1 transmits an access right request signal (e.g., RTS (Request To Send) packet) requesting a right to transmit radio signals to the radio base station AP (hereinafter referred to as "access right") to the radio base station AP. This access right request signal (RTS packet) is received by not only the radio base station AP but also by the radio terminals STA2, STA3 and other radio terminals STA4 to STA6.

The access right request signal (RTS packet) describes duration until the transmission of an access right assignment signal (e.g., CTS (Clear To Send) packet), which is a response signal to the access right request signal (RTS packet) is completed (hereinafter referred to as a "transmission prevention duration").

The radio terminals STA2 to STA6, which have received the access right request signal (RTS packet) whose destination is not the own radio terminal, prevent the transmission of radio signals for the transmission prevention duration (e.g., value of Duration field) (set (NAV (Network Allocation Vector)).

In order for the radio terminal STA1 to transmit radio signals to the radio base station AP simultaneously with other radio terminals under a space multiplexing scheme, the access right request signal describes a period during which the radio terminal STA1 and the other radio terminals transmit radio signals under the space multiplexing scheme (hereinafter referred to as an "SDMA period").

Next, the radio base station AP, which has received the access right request signal in which the SDMA period is described, transmits an access right assignment signal (CTS packet) to not only the radio terminal STA1 but also radio terminals to which radio signals can be transmitted under the space multiplexing scheme simultaneously with the radio terminal STA1 (here, suppose radio terminals STA2 and STA3).

The access right assignment signal (CTS packet) describes the period (SDMA period) during which a plurality of radio terminals (here, radio terminals STA1 to STA3) transmit radio signals under the space multiplexing scheme. Here, suppose the SDMA period described in the CTS packet is the same as the SDMA period described in the RTS packet.

Next, after receiving the CTS packet and being assigned an access right, the radio terminal STA1 transmits a data signal to the radio base station AP so that the transmission of the data signal is completed at timing at which the SDMA period described in the CTS packet ends.

After receiving the CTS packets and being assigned access rights, the radio terminals STA2 and STA3 cancel the transmission prevention of the radio signals (cancel NAV). The radio terminals STA2 and STA3 then transmit data signals to the radio base station AP so that the transmission of the data signals is completed at timing at which the SDMA period described in the CTS packets ends as in the case of the radio terminal STA1.

The radio terminals STA4 to STA6 which have received the access right assignment signals (CTS packets) whose destinations are not the own radio terminals prevent the transmission of radio signals for a transmission prevention duration (value of Duration field) (set NAV).

The transmission prevention duration (value of Duration field) described in the access right assignment signal (CTS packet) is duration during which a series of exchanges between the radio terminals STA1 to STA3 and the radio base station AP is performed (here, duration until transmission of an Ack packet is completed).

Next, the radio base station AP receives the data signals from the radio terminals STA1 to STA3 for the SDMA period and then sends back response signals indicating the situation in which the data signals have been received (e.g., Ack packets) to the radio terminals STA1 to STA3.

As described above, the radio terminals STA1 to STA3 simultaneously transmit radio signals to the radio base station AP under the space multiplexing scheme.

In the above explanations, the access right request signal is assumed to be an RTS packet defined by the IEEE802.11 standard, the access right assignment signal is assumed to be a CTS packet and the response signal is assumed to be an ACK packet, but the present invention is not limited to this. For example, the response signal may also be a Block ACK packet or the like.

Furthermore, when the radio base station AP transmits CTS packets to the radio terminals STA1 to STA3, the addresses of the radio terminals STA1 to STA3 may be specified as multicast addresses or an address of a group of radio terminals that perform transmission to the radio base station AP under the space multiplexing scheme (hereinafter referred to as an "SDMA group") may be specified.

FIG. 4 shows packet configurations of an RTS packet and a CTS packet.

Compared to the IEEE802.11 standard, the RTS packet and CTS packet are different in that they include a field for reporting an SDMA period.

The address of a radio terminal, which is a sender of an RTS packet, and the addresses of radio terminals to which radio signals can be transmitted simultaneously with the radio terminal under the space multiplexing scheme are set as the destination addresses of the CTS packets.

Figure 5:
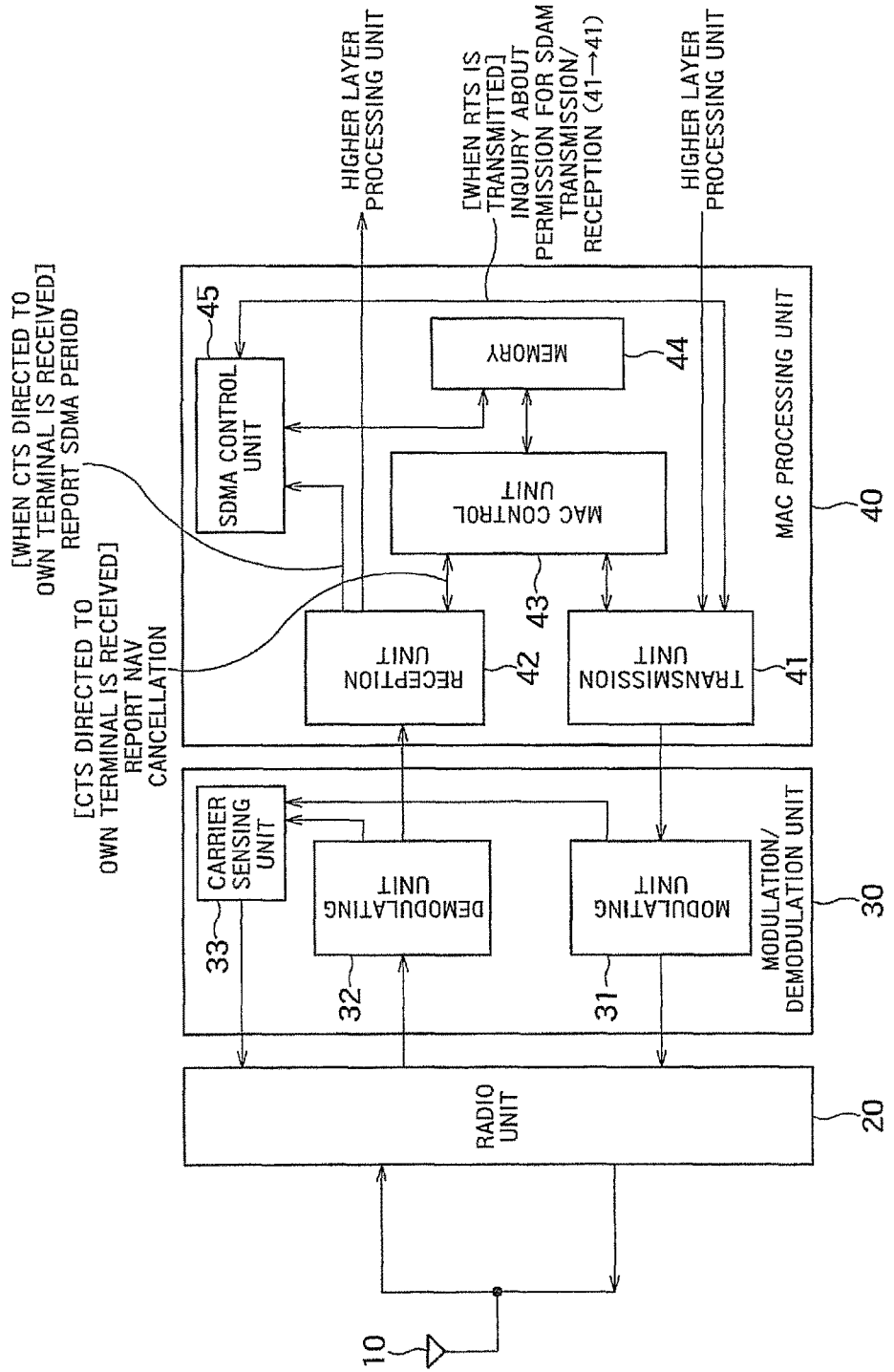
FIG. 5 is a block diagram showing a configuration of a radio terminal according to the first embodiment of the present invention.

FIG. 5 is a block diagram showing a configuration of the radio terminal STA1 according to the first embodiment. The configurations of the radio terminals STA2 and STA3 are also the same.

The radio terminal according to the first embodiment is provided with an antenna 10, a radio unit 20, a modulation/demodulation unit 30 and a MAC processing unit 40. The modulation/demodulation unit 30 is provided with a modulation unit 31, a demodulation unit 32 and a carrier sensing unit 33. The MAC processing unit 40 is provided with a transmission unit 41, a reception unit 42, a MAC control unit 43, a memory 44 and an SDMA control unit 45.

The memory 44 stores an SDMA period and various types of control information.

The MAC control unit 43 may also incorporate the SDMA control unit 45. The MAC control unit 43 may also incorporate the SDMA control unit 45 and memory 44.

First, an overview of the operation of the radio terminal STA1 when transmitting radio signals will be explained. The operations of the radio terminals STA2 and STA3 are also the same.

First, data to be transmitted is outputted from a higher layer processing unit and inputted to the transmission unit 41 of the MAC processing unit 40.

Next, the transmission unit 41 performs processing such as adding a MAC header to the inputted transmission data under the control of the MAC control unit 43. This transmission data is stored as a transmission packet in a transmission buffer (not shown) incorporated in the transmission unit 41.

Next, the transmission unit 41 outputs transmission packets stored in the transmission buffer to the modulation unit 31 in order in which they are stored.

Next, the modulation unit 31 performs processing such as coding processing, modulation processing and physical layer related processing such as addition of a physical header on the inputted transmission packet.

Next, the transmission packet subjected to the physical layer related processing is subjected to D/A (Digital To Analog) conversion processing and frequency conversion to a frequency band of radio communication in the radio unit 20 and transmitted through the antenna 10.

In this way, the radio terminal STA1 transmits radio signals.

Next, an overview of the operation of the radio terminal STA1 when receiving radio signals will be explained. The operations of the radio terminals STA2 and STA3 are also the same.

First, radio signals received through the antenna 10 is subjected to processing of frequency conversion to a baseband and A/D (Analog To Digital) conversion processing in the radio unit 20 and outputted to the demodulation unit 32.

Next, the demodulation unit 32 performs physical layer related processing such as demodulation processing and an analysis of the physical header on the packet outputted from the radio unit 20.

Furthermore, the demodulation unit 32 reports Received Signal Strength Indicator (RSSI) of the received radio signal to the carrier sensing unit 33.

Next, the demodulation unit 32 then outputs the received packet subjected to the physical layer related processing to the MAC processing unit 40.

Next, the reception unit 42 of the MAC processing unit 40 performs MAC layer related processing such as a MAC header analysis.

Next, the reception unit 42 of the MAC processing unit 40 outputs the received packet to a higher layer processing unit when the destination of the received packet is the own radio terminal.

In this way, the radio terminal STA1 receives the radio signal.

Next, an overview of the operation of the radio terminal STA1 when radio signals are transmitted simultaneously with other radio terminals under the space multiplexing scheme (hereinafter referred to as "SDMA transmission") will be explained. The operations of the radio terminals STA2 and STA3 are also the same.

First, the processing until a transmission packet is stored in the transmission buffer is the same as the normal transmission processing in the radio terminal STA1.

Next, when transmitting an RTS packet to the radio base station, the transmission unit 41 inquires of the SDMA control unit 45 about whether or not to perform SDMA transmission.

Next, the SDMA control unit 45 decides whether or not to permit SDMA transmission in response to the inquiry from the transmission unit 41. The decision method of the SDMA control unit 45 will be described later.

Next, when the SDMA transmission is permitted, the transmission unit 41 describes the SDMA period in the RTS packet and performs transmission processing.

On the other hand, when the SDMA transmission is not permitted, the transmission unit 41 does not describe the SDMA period in the RTS packet or describes "0" in the SDMA period and performs transmission processing.

Next, the radio terminal STA1 transmits radio signals according to a CTS packet sent back from the radio base station AP. Here, the operation of the radio terminal STA2 will be shown when the radio terminal STA1 has transmitted an RTS packet and the radio terminal STA2 has received a CTS packet. The operation of the radio terminal STA3 is also the same.

Hereinafter, the CTS packet reception processing of the radio terminal STA2 will be explained.

First, the CTS packet is received through the antenna 10 and subjected to reception processing in the radio unit 20 and demodulation unit 32.

Next, the CTS packet directed to the own radio terminal STA2 is inputted to the reception unit 42 of the MAC processing unit 40.

Next, upon recognizing that the CTS packet directed to the own radio terminal STA2 has been inputted, the reception unit 42 of the MAC processing unit 40 reports cancellation of NAV to the MAC control unit 43.

Furthermore, upon recognizing that the CTS packet directed to the own radio terminal STA2 has been inputted, the reception unit 42 of the MAC processing unit 40 reports the SDMA period described in the CTS packet to the SDMA control unit 45.

Next, upon receiving the report of the SDMA period from the reception unit 42, the SDMA control unit 45 decides whether or not SDMA transmission is possible from the information (e.g., size) of transmission packets stored in the transmission buffer, current transmission rate when transmitting a transmission packet and the length of the SDMA period.

That is, the SDMA control unit 45 calculates the time required to transmit the transmission packet from the information (e.g., size) of the transmission packets stored in the transmission buffer and the current transmission rate when transmitting a transmission packet. When the calculation result is equal to or less than the length of the SDMA period, the SDMA control unit 45 decides that the SDMA transmission is possible.

Next, when the SDMA transmission is decided to be possible, the SDMA control unit 45 calculates timing to start transmission of a data signal (hereinafter referred to as "transmission start timing") so that the end time of the SDMA period coincides with the time at which transmission of the packet is completed.

Next, the SDMA control unit 45 reports a transmission instruction and transmission start timing to the transmission unit 41.

In this way, even when no RTS packet is transmitted, the radio terminal STA2 (radio terminal STA3) which has received a CTS packet operates and thereby allows the radio terminal STA1 which is the sender of the RTS packet and the radio terminal STA2 (radio terminal STA3) to simultaneously transmit radio signals to the radio base station under the space multiplexing scheme.

Figure 6:
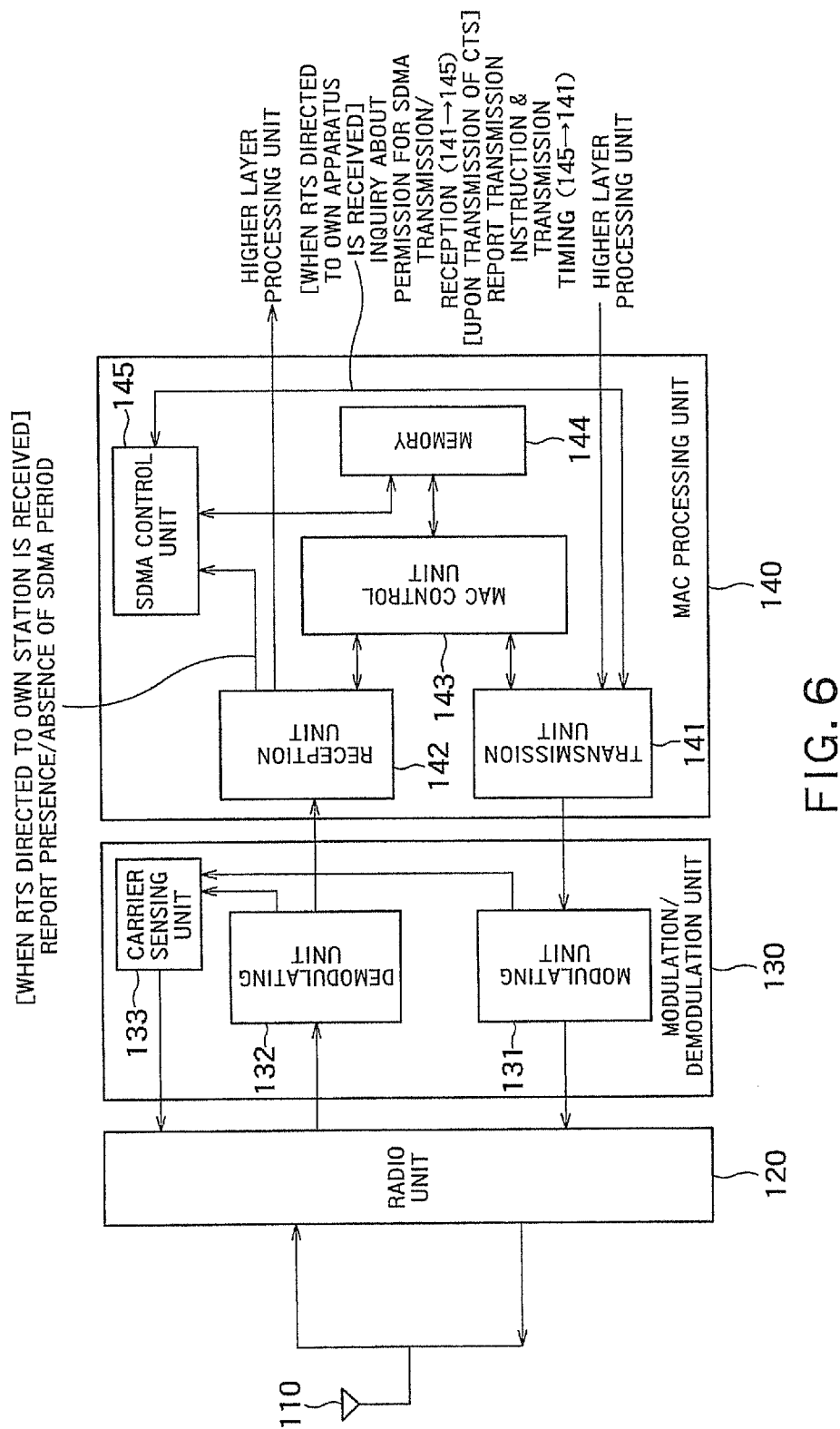
FIG. 6 is a block diagram showing a radio base station according to the first embodiment of the present invention.

FIG. 6 is a block diagram showing a configuration of the radio base station according to the first embodiment.

The radio base station according to the first embodiment is provided with an antenna 110, a radio unit 120, a modulation/demodulation unit 130 and a MAC processing unit 140. The modulation/demodulation unit 30 is provided with a modulation unit 131, a demodulation unit 32 and a carrier sensing unit 133. The MAC processing unit 140 is provided with a transmission unit 141, a reception unit 142, a MAC control unit 143, a memory 144 and an SDMA control unit 145.

The memory 144 stores an SDMA period, various types of control information and information of a group (hereinafter referred to as an "SDMA group") of radio terminals to which radio signals can be simultaneously transmitted under the space multiplexing scheme. The information of the group includes identifiers of the radio terminals belonging to the same group, for example. The number of the radio terminals belonging to the group may be either one or plural number.

The MAC control unit 143 may incorporate the SDMA control unit 145. The MAC control unit 143 may also incorporate the SDMA control unit 145 and memory 144.

Since the operation of the radio base station AP when transmitting/receiving radio signals is the same as the operation explained in the radio terminal STA1, explanations thereof will be omitted. Hereinafter, the operation of the radio base station AP when simultaneously receiving radio signals from a plurality of radio terminals under the space multiplexing scheme will be explained.

First, the operation when the radio base station AP receives an RTS packet in which an SDMA period is described from the radio terminal STA1 will be explained.

First, an RTS packet is received through the antenna 110 and subjected to reception processing in the radio unit 120 and demodulation unit 132.

Next, the RTS packet in which an SDMA period is described is inputted to the reception unit 142 of the MAC processing unit 140.

Next, the reception unit 142 of the MAC processing unit 140 decides whether or not the SDMA period is described in the RTS packet.

When the SDMA period is not described in the RTS packet, the radio base station AP performs processing of sending back a CTS packet to the radio terminal which is the sender of the RTS packet.

On the other hand, when the SDMA period is described in the RTS packet, the reception unit 142 of the MAC processing unit 140 sends a report indicating the presence of an SDMA transmission request to the SDMA control unit 145.

Triggered by the report indicating the presence of the SDMA transmission request, the SDMA control unit 145 reads information on which radio terminals (e.g., radio terminals STA2 and STA3) can be simultaneously transmitted with the sender of the RTS packet (e.g., radio terminal STA1) under the space multiplexing scheme from the memory 144. The information includes, for example, identifiers of the radio terminals which can simultaneously transmit with the sender of the RTS packet under the space multiplexing scheme.

Next, the SDMA control unit 145 reports to the transmission unit 141 that the radio terminal STA1, which is the sender of the RTS packet, and the radio terminals STA2 and STA3 to which radio signals can be simultaneously transmitted under the space multiplexing scheme will be the destination addresses of the CTS packets.

Furthermore, the SDMA control unit 145 reports the length of the SDMA period described in the RTS packet to the transmission unit 141.

Next, the transmission unit 141 sets the destination addresses (addresses of the radio terminals STA1 to STA3) of the CTS packets according to the report from the SDMA control unit 145 and sets the SDMA periods of the CTS packets. The transmission unit 141 transmits the CTS packets in which the destination addresses and the SDMA periods are set.

In this way, upon receiving an RTS packet in which an SDMA period is described from the radio terminal STA1, the radio base station AP sends back CTS packets.

The group of radio terminals to which radio signals can be simultaneously transmitted under the space multiplexing scheme (e.g., radio terminal STA1 which is the sender of the RTS packet and radio terminals to which radio signals can be simultaneously transmitted under the space multiplexing scheme) can be grasped, for example, by the radio base station AP inquiring of the respective radio terminals about their relationships with other radio terminals such as a radio channel environment. The method of grasping the group of radio terminals to which radio signals can be simultaneously transmitted under the space multiplexing scheme is not limited to the method described above and, for example, the technique disclosed in JP-A 2007-208522 (Kokai) and techniques disclosed in other documents can be used.

Second, the operation when the radio base station AP receives RTS packets in which an SDMA period is described from the plurality of radio terminals STA1 to STA3 will be explained.

When a radio base station that does not transmit/receive radio signals under the space multiplexing scheme (e.g., conventional radio base station compliant with the IEEE802.11 standard) simultaneously receives a plurality of radio signals (e.g., RTS packets), interference (collision) occurs and this prevents the radio base station from performing reception.

However, a radio base station AP that can transmit/receive radio signals under the space multiplexing scheme can simultaneously receive a plurality of radio signals (e.g., RTS packets). For example, a radio terminal that belongs to a group capable of spatial multiplexing (e.g., radio terminals STA1 to STA3) can simultaneously transmit RTS packets to the radio base station AP.

Hereinafter, the operation of the radio base station AP upon simultaneously receiving RTS packets from a plurality of radio terminals STA1 to STA3 will be explained.

First, the RTS packets transmitted from the plurality of radio terminals STA1 to STA3 are received through the antenna 110 and subjected to reception processing in the radio unit 120 and demodulation unit 132.

Next, the reception unit 142 of the MAC processing unit 140 receives the RTS packets transmitted from the plurality of radio terminals STA1 to STA3 as input.

Next, the reception unit. 142 of the MAC processing unit 140 decides one RTS packet out of the plurality of inputted RTS packets according to which the reception unit 142 performs processing of sending back a CTS packet.

The method for the reception unit 142 of the MAC processing unit 140 to select an RTS packet according to which the reception unit 142 performs the processing of sending back a CTS packet will be explained below. Suppose, the radio base station AP has simultaneously received RTS packets from the plurality of radio terminals STA1 to STA3.

A first method is a method of determining a radio terminal which has a low frequency with which an access right is acquired (frequency with which a CTS packet is received or frequency with which a CTS packet is received in response to an RTS packet transmitted by itself) out of the plurality of radio terminals which are the senders of a plurality of RTS packets and selecting the RTS packet transmitted from the determined radio terminal.

A second method is a method of determining an SDMA group which has a low frequency with which an access right is acquired (frequency with which a CTS packet is received or frequency with which a CTS packet is received in response to an RTS packet transmitted by itself) out of the plurality of radio terminals which are the senders of a plurality of RTS packets and selecting the RTS packet transmitted from the determined SDMA group.

A third method is a method of determining a radio terminal which has a long period that has elapsed after acquiring the last access right (period that has elapsed after receiving the last CTS packet or period that has elapsed after receiving a CTS packet in response to an RTS packet transmitted by itself) out of a plurality of radio terminals which are the senders of a plurality of RTS packets and selecting the RTS packet transmitted from the determined SDMA group.

A fourth method is a method of determining an SDMA group which has a long period that has elapsed after acquiring the last access right (period that has elapsed after receiving the last CTS packet or period that has elapsed after receiving a CTS packet in response to an RTS packet transmitted by itself) out of a plurality of SDMA groups which are the senders of a plurality of RTS packets and selecting the RTS packet transmitted from the radio terminal belonging to the determined SDMA group.

A fifth method is a method of selecting, when RTS packets are simultaneously received from a plurality of radio terminals STA1 to STA3 belonging to the same SDMA group, an RTS packet in which a longest SDMA period is described out of the SDMA periods described in the plurality of RTS packets.

In the first embodiment, the method for the reception unit 142 of the MAC processing unit 140 to select an RTS packet according to which the MAC processing unit 140 performs processing of sending back a CTS packet is not limited to the above described selection method.

In this way, according to the radio system of the first embodiment, the radio base station transmits, when receiving an access right request signal from a certain radio terminal, an access right assignment signal, which is a response thereto, to not only the radio terminal which is the sender of the access right assignment signal but also radio terminals which can transmit radio signals to the own radio base station simultaneously with the radio terminal under the space multiplexing scheme, and it is thereby possible for a plurality of radio terminals to simultaneously transmit radio signals to the radio base station under the space multiplexing scheme.

According to the radio system of the first embodiment, even when an access right request signal transmitted by a certain radio terminal to a radio base station is received by another radio terminal and the transmission of the radio signal is prevented by the other radio terminal, if the other radio terminal which prevents the transmission of the radio signal receives the access right assignment signal, a plurality of radio terminals can simultaneously transmit radio signals to the radio base station under the space multiplexing scheme by canceling the prevention of the transmission of the radio signal.

As the protocol when a plurality of radio terminals simultaneously transmit radio signals to a radio base station under the space multiplexing scheme, it is possible to provide a protocol in consideration of NAV defined in IEEE802.11.

Furthermore, even when a radio base station simultaneously receives access right request signals from a plurality of radio terminals under the space multiplexing scheme, it is possible to provide a protocol in consideration of NAV defined in IEEE802.11 as the protocol when the plurality of radio terminals simultaneously transmit radio signals to the radio base station under the space multiplexing scheme.

<Modification Example 1>

The above described first embodiment assumes that an SDMA period is described in an RTS packet transmitted by the radio terminal STA1 to the radio base station AP. However, the effect by the radio system according to the first embodiment can be achieved even if the SDMA period is not described in the RTS packet transmitted by the radio terminal STA1 to the radio base station AP and an RTS packet configuration defined in the IEEE802.11 standard is adopted.

The radio terminal STA1 describes the duration until a series of exchanges between the radio terminal STA1 and radio base station AP is completed (e.g., until the time at which the reception of the Ack packet shown in FIG. 3 ends) in the value of the "Duration" field of the RTS packet.

In the example in FIG. 3, the radio terminal STA1 describes a value resulting from adding up SIFS, CTS reply time, SIFS, length of SDMA period, SIFS and Ack reply time as the value of the Duration field of the RTS packet.

Even if the SDMA period is not described in the RTS packet, the radio base station AP calculates the SDMA period in consideration of the time required for transmission of the CTS packet and ACK packet or the like.

In the example of FIG. 3, the radio base station AP can calculate the result of subtracting SIFS, CTS reply time, SIFS, SIFS and Ack reply time from the value of the Duration field of the RTS packet as the SDMA period.

The radio base station AP may also always receive radio signals from a predetermined radio terminal simultaneously with other radio terminals under the space multiplexing scheme.

When a radio terminal which is the sender of an RTS packet belongs to any one SDMA group, the radio base station AP may also receive radio signals from the radio terminal which is the sender of the RTS packet simultaneously with the other radio terminals under the space multiplexing scheme.

Furthermore, the radio terminal STA1 may report whether or not to perform transmission/reception of radio signals under the space multiplexing scheme using part of an RTS packet transmitted from the radio terminal STA1 to the radio base station AP.

Whether or not the radio terminal STA1 performs transmission/reception of radio signals under the space multiplexing scheme may be described in a signal field of a PHY header of an RTS packet or Frame Control of a MAC header.

This radio base station AP and radio terminals STA1 to STA3 can also be realized using, for example, a general-purpose computer as basic hardware. That is, the transmission unit 41, 141, reception unit 42, 142, MAC control unit 43, 143, and SDMA control unit 45, 145 can be realized by causing a processor mounted on the computer to execute a program. In this case, the radio base station AP and radio terminals STA1 to STA3 may also be realized by installing the program in the computer beforehand or storing the program in a storage medium such as a CD-ROM or distributing the program via a network and installing the program in the computer as appropriate. Furthermore, the memory 44, 144 and transmission buffer may also be realized using the memory 44, 144 and hard disk incorporated in or externally provided for the computer or a storage medium such as a CD-R, CD-RW, DVD-RAM, and DVD-R as appropriate.

(Embodiment 2)

As the radio system according to the first embodiment, the mechanism for a plurality of radio terminals to transmit radio signals to a radio base station under the space multiplexing scheme simultaneous has been explained.

The radio system according to a second embodiment uses a concept of "TXOP period" defined in the IEEE802.11e standard during which packets are transmitted/received without relinquishing any access right.

In the radio system according to the second embodiment, the radio terminal describes duration until the TXOP period ends in the transmission prevention duration (e.g., value of Duration field) of an access right, request signal (e.g., RTS packet).

Figure 7:
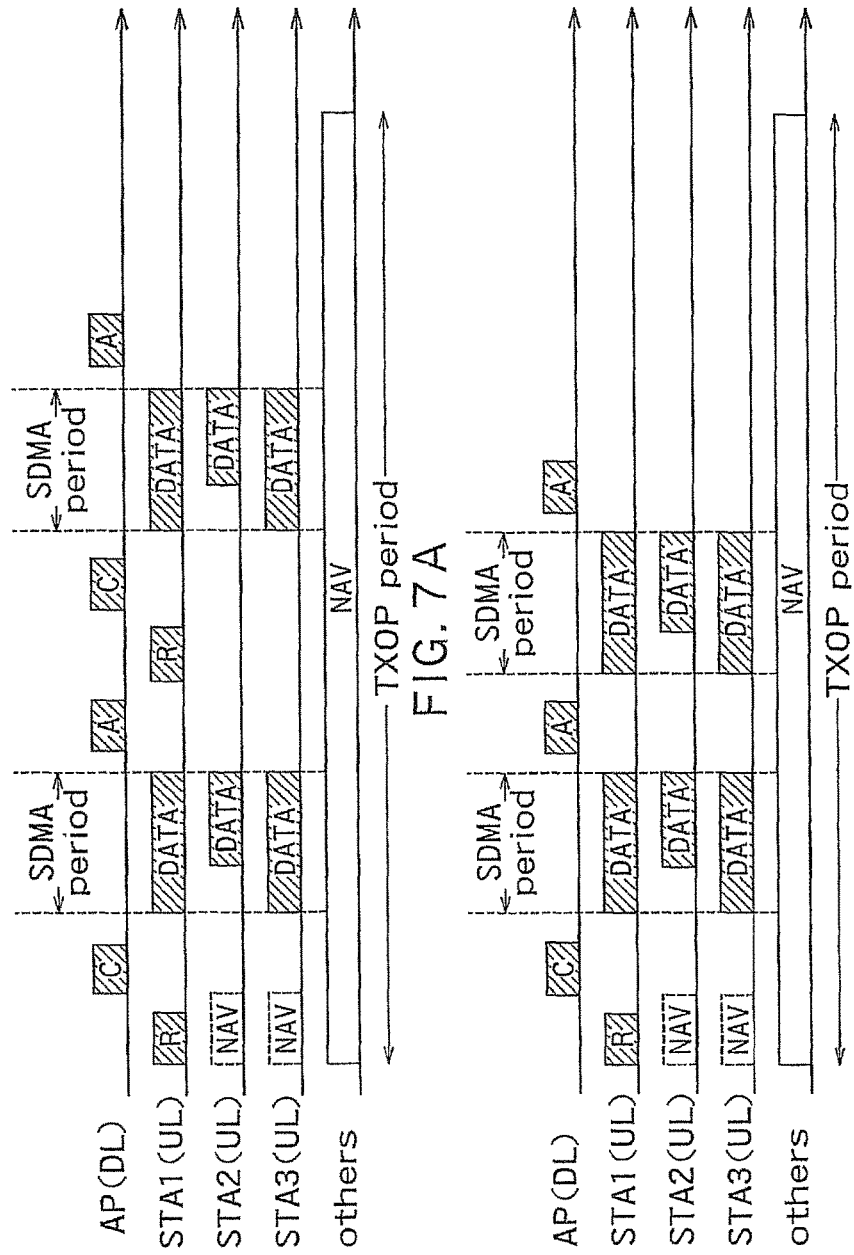
FIGS. 7A and 7B are a time chart showing radio signals transmitted/received between a radio base station and a radio terminal.

FIGS. 7A and 7B are a time chart showing radio signals transmitted/received between the radio terminals STA1 to STA3 and radio base station AP when the radio terminals STA1 to STA3 continuously transmit radio signals to the radio base station AP under SDMA within a TXOP period. A plurality of SDMA periods are included in the TXOP period. TXOP period corresponds to a first period and each SDMA period corresponds to a second period respectively, for example.

Here, an RTS packet is described in abbreviation as "R", CTS packet as "C", data packet as "DATA" and Ack packet as "A."

FIG. 7A is a time chart when an access right request signal (RTS packet) and an access right assignment signal (CTS packet) are transmitted/received between the radio terminals STA1 to STA3 and radio base station AP for every SDMA period.

FIG. 7B is a time chart when an access right request signal (RTS packet) and an access right assignment signal (CTS packet) are not transmitted/received and exchanges of RTS packets and CTS packets are omitted between the radio terminals STA1 to STA3 and radio base station AP for every SDMA period.

Each SDMA period included in the TXOP period has the same length. The length of each SDMA period is determined by the SDMA period inserted in the CTS packet sent back by the radio base station to the radio terminal STA1 that has transmitted the first RTS packet.

The configurations of the RTS packet and CTS packet according to the second embodiment are similar to those of the RTS packet and CTS packet according to the first embodiment shown in FIG. 4.

The configuration of the radio base station according to the second embodiment is similar to the configuration of the radio base station according to the first embodiment shown in FIG. 6.

Figure 8:
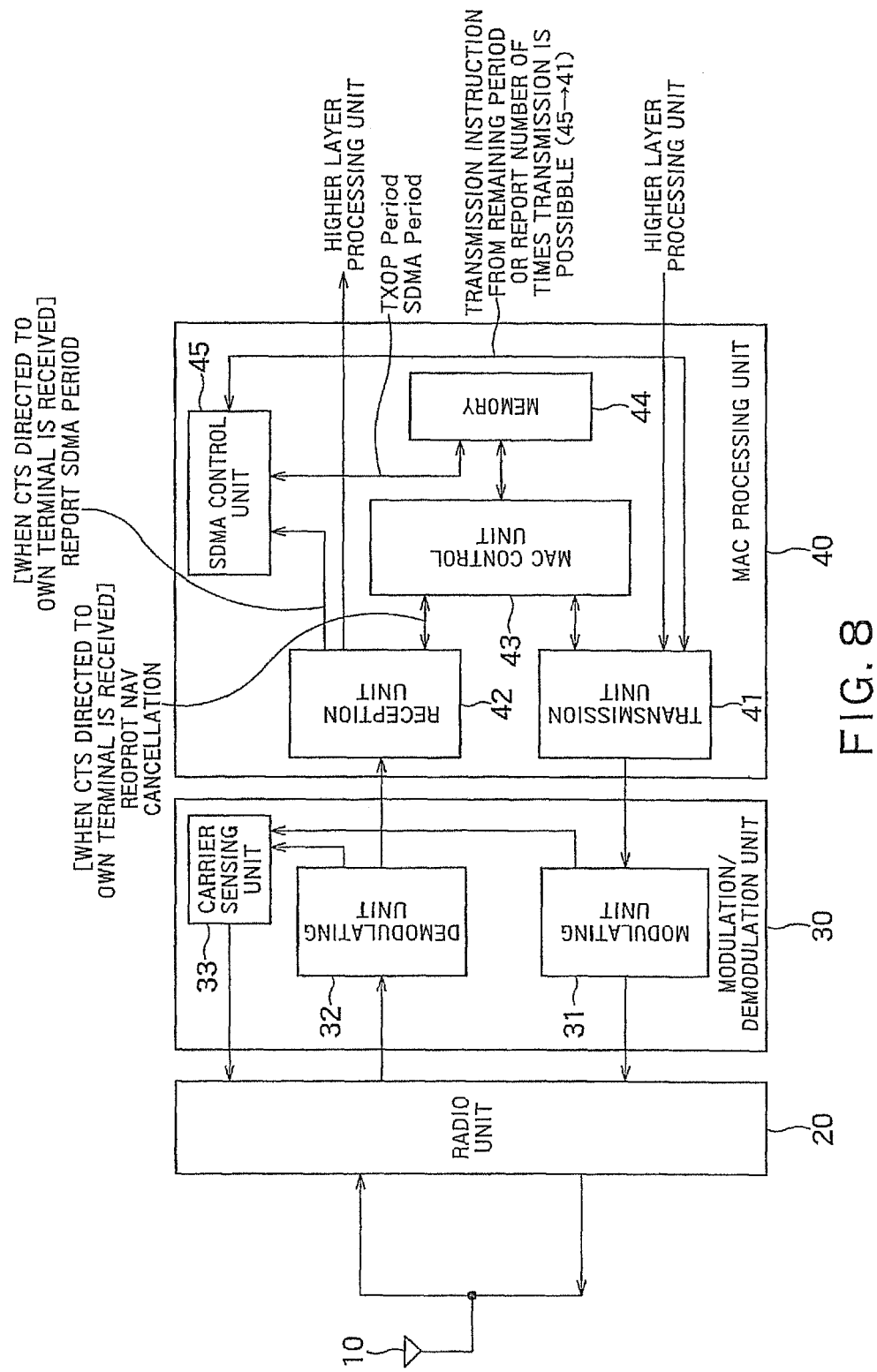
FIG. 8 is a block diagram showing a configuration of a radio terminal according to a second embodiment of the present invention.

FIG. 8 is a block diagram showing a configuration of a radio terminal STA1 according to the second embodiment. The configurations of radio terminals STA2 and STA3 are also the same. Explanations of the same parts of the radio terminal STA1 according to the second embodiment as those of the radio terminal STA2 according to the first embodiment will be omitted.

The radio terminal STA1 according to the second embodiment is provided with an antenna 10, a radio unit 20, a modulation/demodulation unit 30 and a MAC processing unit 40. The modulation/demodulation unit 30 is provided with a modulation unit 31, a demodulation unit 32 and a carrier sensing unit 33. The MAC processing unit 40 is provided with a transmission unit 41, a reception unit 42, a MAC control unit 43, a memory 44 and an SDMA control unit 45.

The memory 44 stores a TXOP period and SDMA period described in a CTS packet sent back from the radio base station AP and various types of control information.

The SDMA control unit 45 decides whether or not transmission of further data packets is possible during the TXOP period according to the TXOP period and SDMA period stored in the memory 44.

That is, triggered by the reception of a response signal (Ack frame) in response to a data packet which has already been transmitted, the SDMA control unit 45 decides whether or not a new SDMA period can be reserved within the remaining TXOP period in consideration of the TXOP period, SDMA period, time required to receive a response signal and SIFS or the like.

When deciding that transmission of further data packet is possible, the SDMA control unit 45 instructs the transmission unit 41 to transmit the next data packet.

Instead of deciding whether or not transmission of the next data packet is possible every time a response signal (Ack frame) is received, the SDMA control unit 45 may calculate the number of SDMA periods that can be reserved within the TXOP period beforehand and transmit the same number of data packets as the number of times of the calculation result. That is, the SDMA control unit 45 may calculate the number of data packets that can be transmitted within the TXOP period beforehand and thereby decide whether or not transmission of the next packet is possible.

In this way, according to the radio system of the second embodiment, even when a plurality of radio terminals simultaneously transmit radio signals to the radio base station under the space multiplexing scheme, it is possible to provide a mechanism of continuously transmitting radio signals within a period (TXOP period) during which radio signals can be continuously transmitted without relinquishing the access right and improve transmission efficiency and reception efficiency of the radio signal.

(Embodiment 3)

When a plurality of radio terminals continuously transmit radio signals to a radio base station within a TXOP period, the radio system of a third embodiment shows a mechanism of flexibly changing the length of SDMA period and the plurality of radio terminals (SDMA group) that transmit radio signals to the radio base station under SDMA.

(Example 1)

Figure 9:
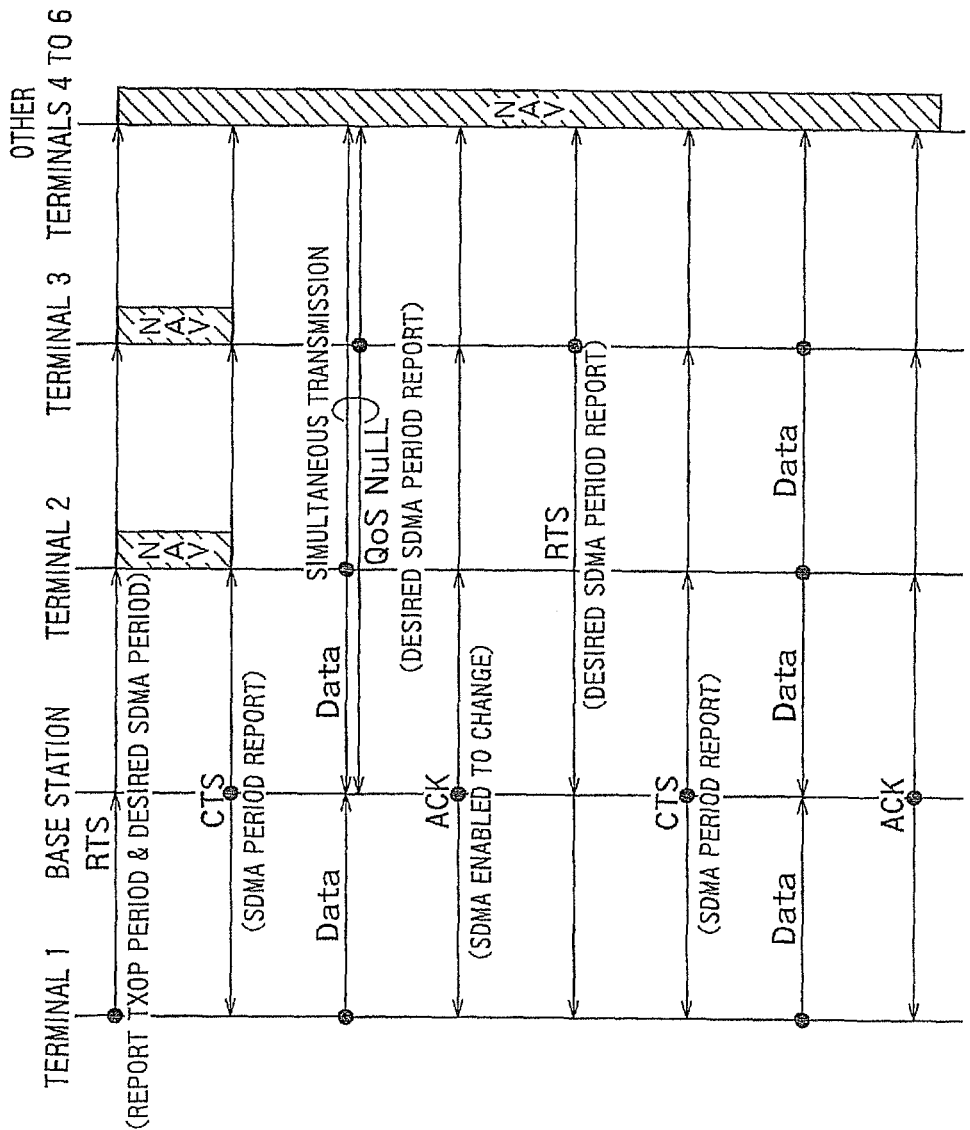
FIG. 9 is a time chart showing radio signals transmitted/received between a radio base station and a radio terminal.
Figure 10:
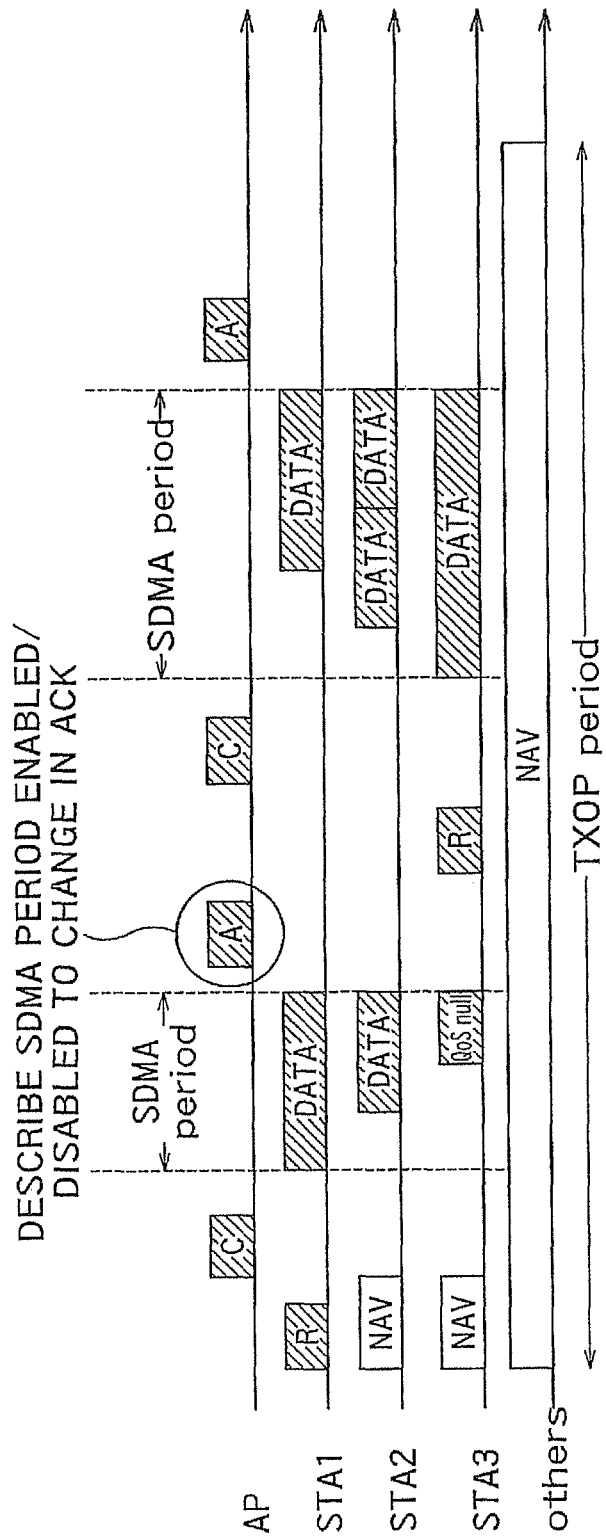
FIG. 10 is a time chart showing radio signals transmitted/received between a radio base station and a radio terminal.

FIGS. 9 and 10 are time charts showing radio signals transmitted/received between the radio terminals STA1 to STA3 and radio base station AP in the radio system according to the third embodiment of the present invention.

First, in order to acquire an access right to the radio base station AP, the radio terminal STA1 transmits an access right request signal (RTS packet) to the radio base station AP. The radio base station AP transmits an access right assignment signal (CTS packet) to the radio terminals STA1 to STA3. In this way, the TXOP period and SDMA period are determined as in the case of the radio system of the second embodiment.

The radio terminals STA2 and STA3, which have not transmitted any RTS packet to the radio base station AP, yet have received a CTS packet, transmit a data packet according to the SDMA period described in the CTS packet.

The radio terminals STA2 and STA3 attempt to transmit data packets according to the request of the radio terminal STA1 (RTS packet) so that the transmission of data packets is completed within the set SDMA period.

However, depending on the length of the SDMA period set according to the request of the radio terminal STA1, there can be a situation in which even a radio terminal (e.g., radio terminal STA3) that can perform transmission together with the radio terminal STA1 under the space multiplexing scheme cannot transmit a data packet. One such example is a situation in which the SDMA period is so short that even when any one of data packets stored in the transmission buffer of the radio terminal STA3 is transmitted, the transmission is not completed within the SDMA period.

Although the radio terminal STA3 has already received the CTS packet from the radio base station AP and data packets are stored in the transmission buffer, the radio terminal STA3 cannot transmit any data packet because the length of the SDMA period is not appropriate.

The radio terminal STA3 transmits a change request signal (control signal) for requesting a change of the length of the SDMA period instead of the data packet to the radio base station AP during the SDMA period. The radio terminal STA3 transmits the change request signal so that the transmission of the change request signal is completed when the SDMA period ends.

FIGS. 9 and 10 have shown an example where a "QoS Null" packet is used as a change request signal. However, the change request signal only needs to have a field that allows the SDMA period desired by the source radio terminal to be described and may be a signal defined in other IEEE802.11 standards or a newly defined signal.

Next, upon receiving the change request signal, the radio base station AP decides whether to change the SDMA period or change the radio terminal that performs SDMA transmission (SDMA group) from the currently set SDMA period and the SDMA period described in the change request signal.

Next, upon deciding that the SDMA period or SDMA group can be changed, the radio base station AP sends back a response signal (Ack packet) describing "SDMA enabled to change."

On the other hand, upon deciding that the SDMA period or SDMA group cannot be changed, the radio base station AP sends back a response signal (Ack packet) describing "SDMA disabled to change" or sends back a normal response signal (Ack packet).

Next, the radio terminals STA1 to STA3 receive the above described response signal (Ack packet).

When "SDMA disabled to change" is described in the above described response signal (Ack packet) or when the above described response signal (Ack packet) is a normal Ack packet, the radio terminals STA1 to STA3 transmit data packets according to the currently set SDMA period.

On the other hand, when "SDMA enabled to change" is described in the above described response signal (Ack packet), the radio terminal STA3 which has transmitted the change request signal receives the above described response signal and then transmits an RTS packet describing a desired SDMA period to the radio base station AP after a lapse of SIFS.

Next, the radio base station AP transmits a CTS packet describing an SDMA period desired by the radio terminal STA3 to the radio terminals STA1 to STA3.

When changing the SDMA period, the radio base station AP substitutes the value of the changed SDMA period into the SDMA period field of the CTS packet shown in FIG. 4.

Furthermore, when changing the SDMA group, the radio base station AP transmits the above described CTS packet to a plurality of radio terminals belonging to a new SDMA group. The radio terminal which has received the CTS packet from the radio base station AP then restarts the transmission of data packets.

In this way, the SDMA period and SDMA group are changed within the TXOP period.

By so doing, the radio base station AP needs only to decide whether or not it is possible to change the SDMA period or SDMA group during the SIFS period after QoS Null is received from the radio terminal STA3 until a response signal (Ack packet) is transmitted, and can thereby suppress the processing speed required for the radio base station AP compared, for example, to a case where the changed SDMA period is reported.

The above explanation has assumed that the radio terminal STA3, which has transmitted QoS Null, transmits an RTS packet. However, the SDMA period requested by the radio terminal STA3 has already been reported to the radio base station AP through the change request signal. Therefore, the radio terminal STA1 may transmit an RTS packet to the radio base station AP instead of the radio terminal STA3 transmitting an RTS packet to the radio base station AP. That is, when desiring the suspension of the change of the SDMA period, suppose the radio terminal STA1 transmits an RTS packet to request the holding of the currently set SDMA period.

By so doing, it is possible to prevent an SDMA period which is undesirable for the radio terminal STA1 which has acquired the first access right to the radio base station AP from being set.

(Example 2)

Figure 11:
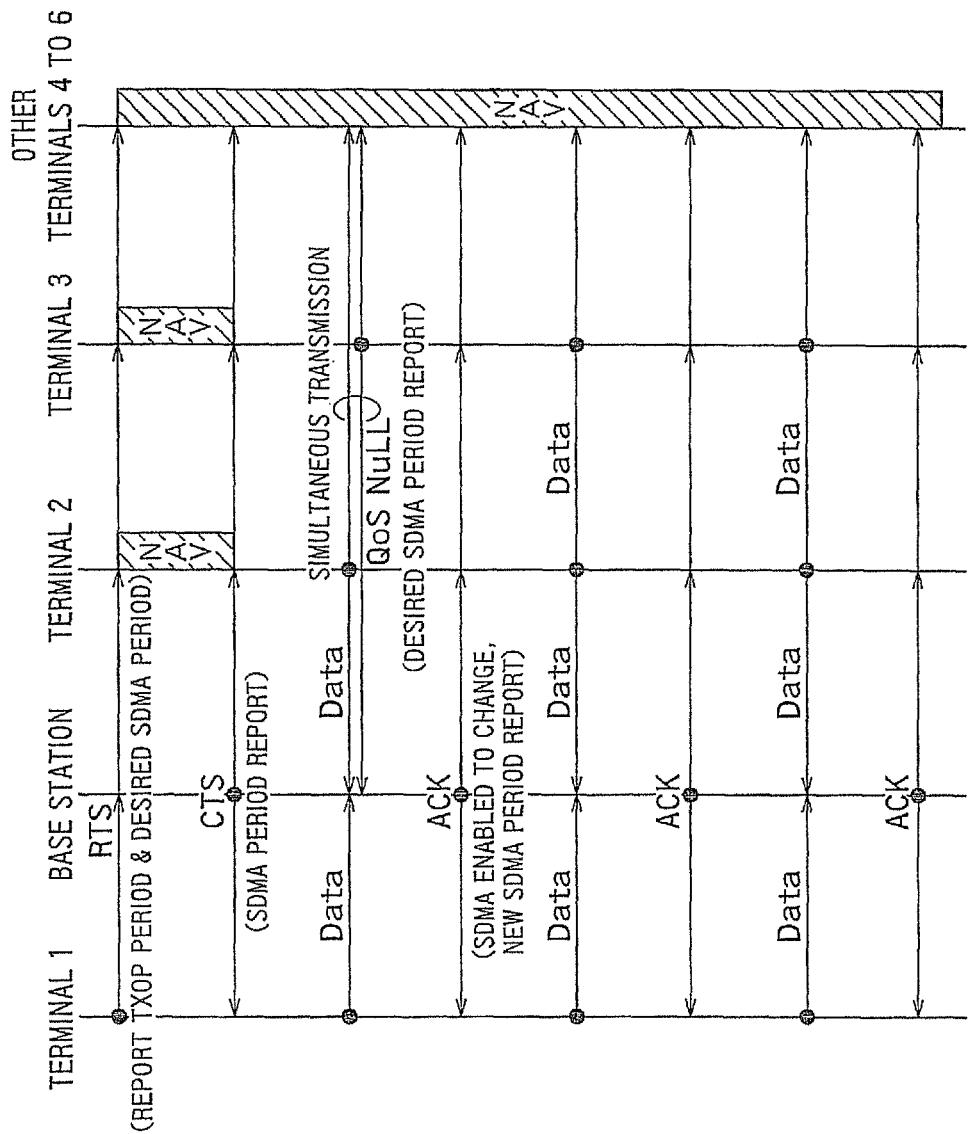
FIG. 11 is a time chart showing radio signals transmitted/received between a radio base station and a radio terminal.
Figure 12:
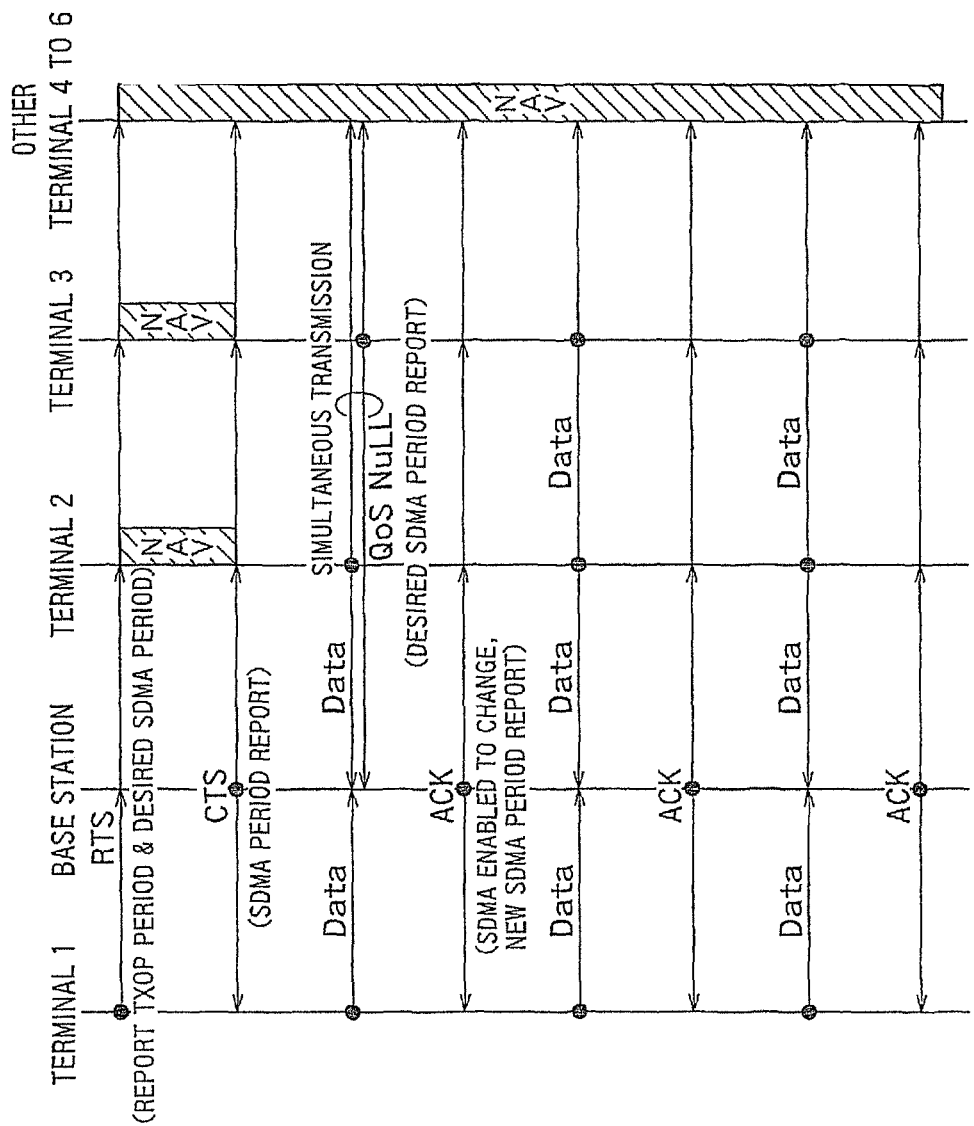
FIG. 12 is a time chart showing radio signals transmitted/received between a radio base station and a radio terminal.

FIGS. 11 and 12 are time charts showing radio signals transmitted/received between the radio terminals STA1 to STA3 and the radio base station AP in the radio system according to the third embodiment of the present invention.

In Example 1 shown in FIGS. 9 and 10, the radio terminal STA3 transmits a change request signal and then transmits an RTS packet in which a desired SDMA period is described.

However, after the radio base station AP receives the change request signal, "SDMA enabled to change" may be described and a response signal (Ack packet) in which the changed SDMA period is described may be transmitted. By so doing, transmission/reception of an RTS packet and CTS packet between the radio terminal STA3 and the radio base station AP can be omitted.

First, in Example 2, the radio base station AP receives a change request signal (QoS Null) from the radio terminal STA3 as in the case of Example 1 and decides whether or not to change the SDMA period.

Upon deciding to change the SDMA period, the radio base station AP transmits a response signal (Ack packet) in which "SDMA enabled to change" and changed SDMA period are described to the radio terminals STA1 to STA3.

Next, upon receiving a response signal (Ack packet), the radio terminals STA1 to STA3 decide "SDMA enabled/disabled to change" from the response signal.

Upon deciding "SDMA disabled to change," the radio terminals STA1 to STA3 continue to transmit data packets after SIFS according to the currently set SDMA period.

On the other hand, upon deciding "SDMA enabled to change," the radio terminals STA1 to STA3 continue to transmit data packets after SIFS according to the changed SDMA period described in the response signal.

Although the SDMA group cannot be changed, this makes it possible to omit, when changing the SDMA period within the TXOP period, exchanges of RTS packets and CTS packets and is therefore efficient.

Two examples (Example 1 and Example 2) have been explained above, but the radio base station AP may also change the SDMA period using any one of the method explained in Example 1 and the method explained in Example 2.

The radio base station AP may also use different methods, such as adopting the method explained in Example 1 when changing the SDMA group and adopting the method explained in Example 2 when only changing the SDMA period.

Furthermore, the explanations in Example 1 and Example 2 assume the situation in which since the SDMA period set by the radio terminal STA1 is so short that the radio terminal STA3 cannot transmit data packets.

However, on the contrary, there can also be a situation in which the SDMA period set by the radio terminal STA1 is so long that the radio terminal STA3 cannot transmit data packets efficiently.

Furthermore, the radio terminal STA3 may also use an RTS packet without transmitting it to report that although the radio terminal STA3 has received a CTS packet, no data packet to be transmitted to the radio base station AP is stored in the transmission buffer.

For example, the radio terminal STA3 may report that no data packet to be transmitted to the radio base station AP is stored in the transmission buffer to the radio base station AP by sending an RTS packet in which the SDMA period is set to "0." In this case, upon receiving the RTS packet in which the SDMA period is set to "0," the radio base station AP can decide to change the SDMA group.

(Example 3)

Figure 13:
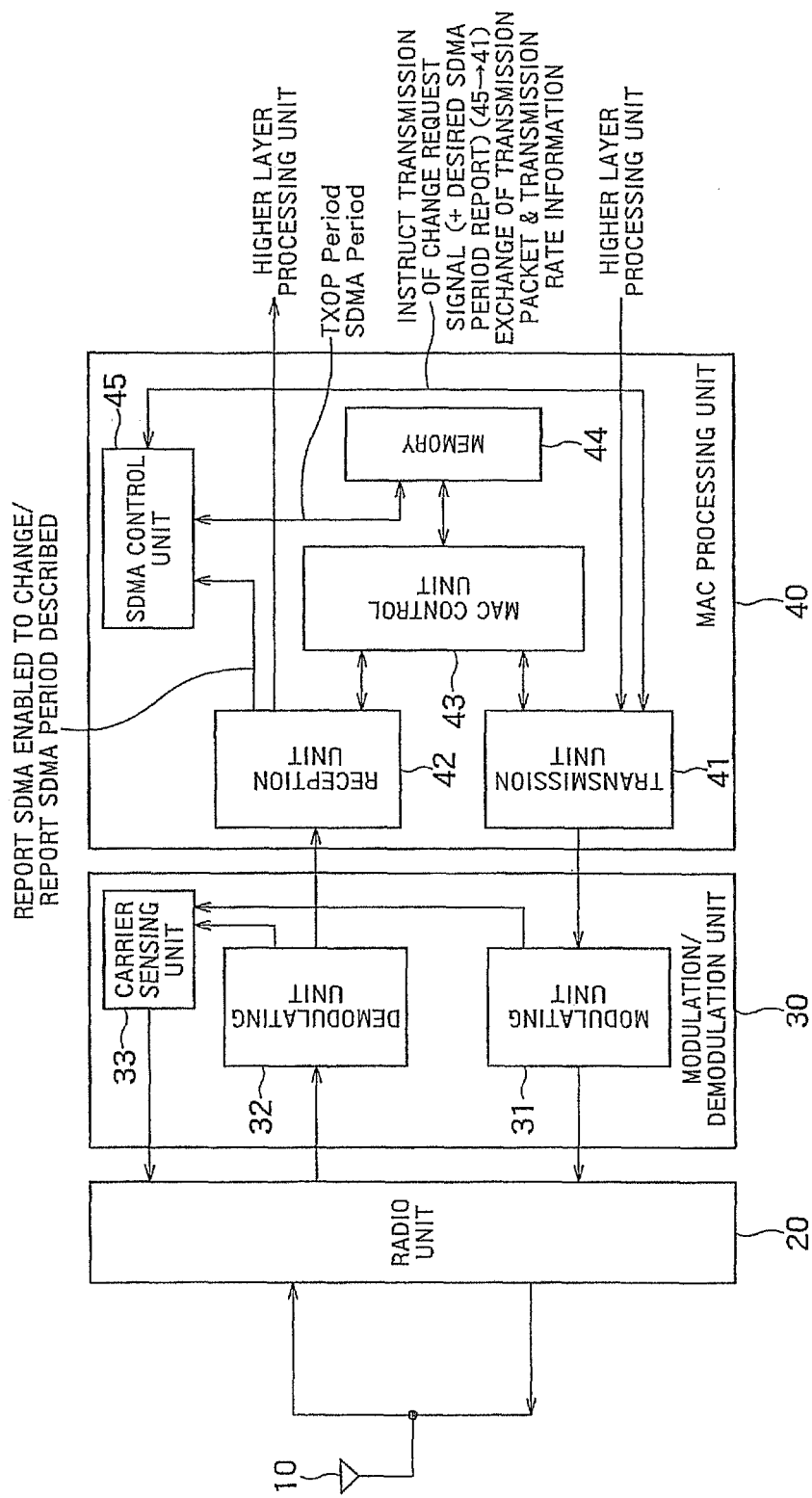
FIG. 13 is a block diagram showing a configuration of a radio terminal according to a third embodiment of the present invention.

FIG. 13 is a block diagram showing a configuration of a radio terminal STA1 according to a third embodiment. The configurations of radio terminals STA2 and STA3 are also the same. Hereinafter, the differences from the radio terminal according to the second embodiment (operation of the SDMA control unit 45) will be mainly explained.

The SDMA control unit 45 of the radio terminal STA1 decides whether or not to desire a change of an SDMA period. For example, the SDMA control unit 45 decides whether or not to desire a change of the SDMA period depending on whether transmission of a data packet is possible within the current SDMA period.

When it is decided that the change of the SDMA period is desired, the SDMA control unit 45 instructs the transmission unit 41 to transmit a change request signal (QoS Null). The SDMA control unit 45 may also indicate the value of a desired SDMA period as well when instructing the transmission of the change request signal.

Upon receiving a response signal (Ack packet) in which "SDMA enabled to change" is described and also the SDMA period is described from the radio base station AP, the SDMA control unit 45 of the radio terminal STA1 instructs the transmission unit 41 to transmit a data packet according to the SDMA period described in the response signal.

Upon receiving the response signal (Ack packet) in which "SDMA enabled to change" from the radio base station AP, the SDMA control unit 45 of the radio terminal STA1 decides whether or not to desire a change of the SDMA period and instructs, when the change is desired, the transmission unit 41 to transmit a signal in which the SDMA period is described.

Figure 14:
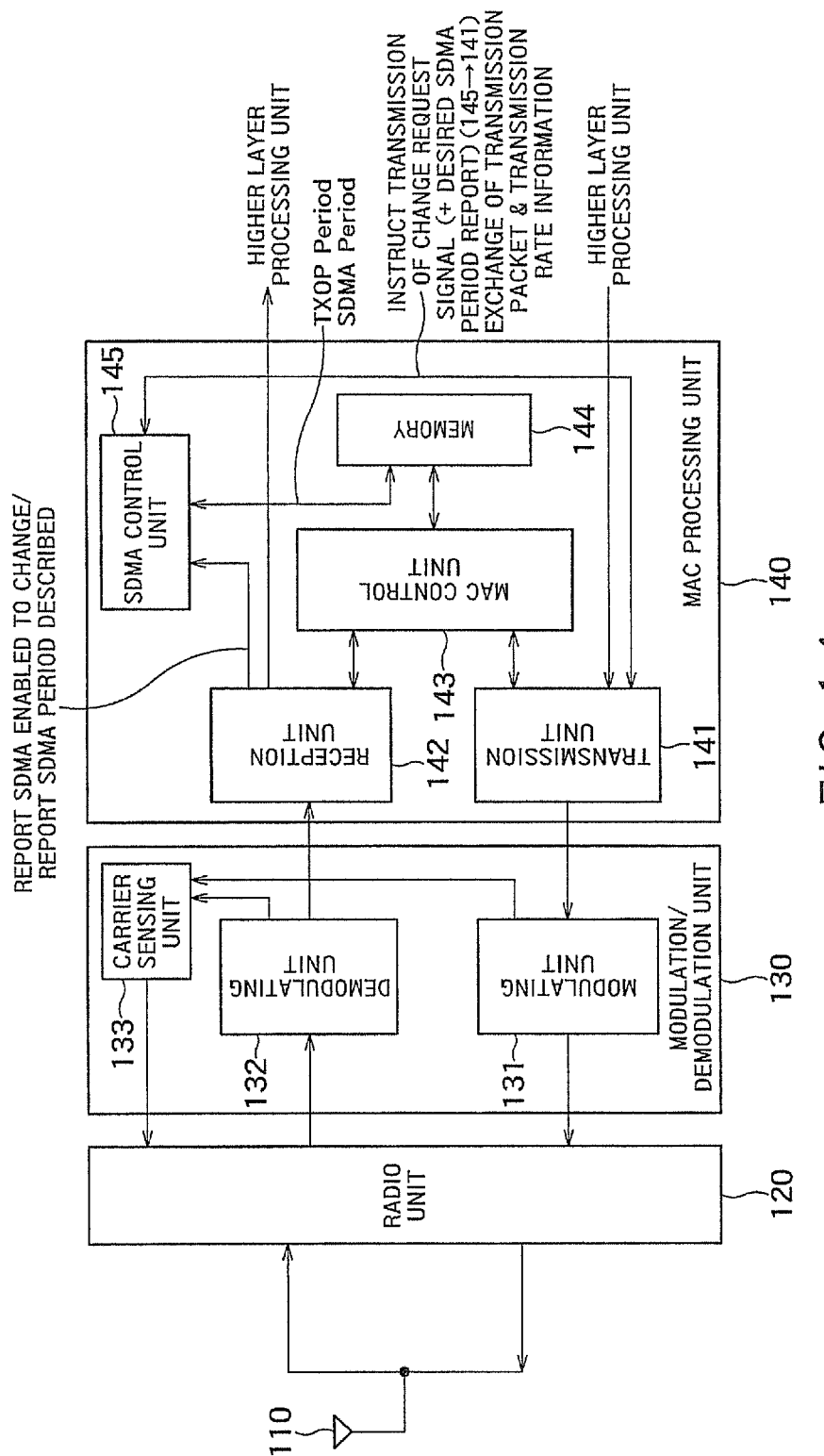
FIG. 14 is a block diagram showing a configuration of a radio base station according to the third embodiment of the present invention.

FIG. 14 is a block diagram showing a configuration of the radio base station AP according to the third embodiment. Hereinafter, the differences from the radio base station according to the second embodiment will be mainly explained.

Suppose the radio base station AP has received a change request signal (RTS packet) from a radio terminal. The SDMA control unit 145 decides whether to change the SDMA period or change the SDMA group from the current SDMA period and SDMA period information described in the RTS packet.

Upon deciding that the SDMA period or SDMA group is to be changed, the SDMA control unit 145 instructs the transmission unit 141 to transmit a response signal (Ack packet) in which "SDMA enabled to change" is described.

When the SDMA period is changed, the SDMA control unit 145 may also report the changed SDMA period to the transmission unit 141 together with an instruction to transmit a response signal in which "SDMA enabled to change" is described.

According to the radio terminals STA1 to STA3 and the radio base station according to the third embodiment, when any one of the plurality of radio terminals that simultaneously transmit radio signals to the radio base station AP under the space multiplexing scheme cannot transmit radio signals at the current transmission rate due to influences of situations of radio channels or the like, the radio terminal can perform retransmission at a reduced transmission rate.

The IEEE802.11 standard defines a technique whereby when transmission of radio signals fails, retransmission is performed at a reduced transmission rate. However, when retransmission is performed at a reduced transmission rate, the packet transmission time becomes longer.

Here, if the packet transmission time for retransmission at the reduced transmission rate is within the SDMA period, there is no problem. However, there can be a situation in which the packet transmission time for retransmission at the reduced transmission rate exceeds the SDMA period.

In this case, since each of the plurality of radio terminals that simultaneously transmit radio signals under the space multiplexing scheme is allowed to change the SDMA period, it is possible to support retransmission at the reduced transmission rate.

That is, by setting a longer SDMA period than the packet transmission time when retransmission is performed at the reduced transmission rate, data packets can be retransmitted at the reduced transmission rate.

When a plurality of radio terminals continuously transmit radio signals to the radio base station under the space multiplexing scheme, by providing a mechanism that makes it possible to flexibly change the period (TXOP period) of transmitting radio signals under SDMA and a group (SDMA group) of radio terminals that transmit radio signals under SDMA even during an SDMA period during which radio signals are transmitted under SDMA, it is possible to increase the possibility of transmission/reception of radio signal between a plurality of radio terminals and the radio base station, and thereby improve throughput of the overall system.

(Embodiment 4)

The third embodiment has explained the case where the radio base station receives a signal for requesting a change of the SDMA period (RTS packet) from one radio terminal.

The fourth embodiment will explain a case where a radio base station receives change request signals from a plurality of radio terminals.

Upon receiving change request signals from a plurality of radio terminals STA1 to STA3, a radio base station AP determines whether or not to send back a response signal according to the change request signal transmitted from any one of the radio terminals.

A first method is a method of selecting a change request signal from a radio terminal which has acquired TXOP and sending back a response signal thereto.

A second method is a method of selecting, after the radio base station AP fails to receive a packet transmitted from a certain radio terminal (the radio base station AP has received some signal level but failed to decode the packet), a change request signal from the radio terminal and sending back a response signal thereto.

A third method is a method of selecting, when change request signals are received from a plurality of radio terminals STA1 to STA3 belonging to the same SDMA group, a change request signal of a longest SDMA period described out of the plurality of change request signals and sending back a response signal thereto.

A fourth method is a method of selecting a change request signal from a radio terminal having a maximum number of retransmissions and sending back a response signal thereto.

The radio base station can use any one of the above described four methods or combine the above described four methods.

In this way, according to the radio system of the fourth embodiment, even when the radio base station simultaneously receives SDMA period change requests from a plurality of radio terminals, it is possible to flexibly change an SDMA period and SDMA group.

Therefore, it is possible to increase the possibility of transmission/reception of radio signals between a plurality of radio terminals and a radio base station and improve throughput of the overall system.

The present invention is not limited to the exact embodiments described above and can be embodied with its components modified in an implementation phase without departing from, the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. A radio base station, comprising:
a transmitter configured to transmit a first signal for assigning an access right to a first radio terminal and a second radio terminal for transmission under a multiplexing scheme, the first signal including information on a transmission opportunity period (TXOP) and a first length, and the first length being a length of radio signals transmitted from the first radio terminal and the second radio terminal under the multiplexing scheme; and
a receiver configured to receive, within the TXOP, the radio signals from the first radio terminal and the second radio terminal under the multiplexing scheme, the length of the radio signals is the first length,
wherein transmission of the first radio signal by the first radio terminal and transmission of the second radio signal by the second radio terminal simultaneously end,
wherein the second radio terminal prevents transmission of its radio signal upon receiving a request signal transmitted from the first radio terminal directed to the radio base station, and
wherein the second radio terminal cancels prevention of the transmission of its radio signal and simultaneously transmits its radio signal with the radio signals of the first radio terminal under the multiplexing scheme upon receiving the first signal even when the transmission of its radio signals is prevented according to the request signal directed to the radio base station.

2. The station according to claim 1, the transmitter transmits an ACK for the first radio terminal and the second radio terminal within the TXOP after reception of the radio signals from the first radio terminal and the second radio terminal completes.

3. The station according to claim 1, wherein the first signal includes information on an address of a group to which the first radio terminal and the second radio terminal belong.

4. The station according to claim 1, wherein the first signal includes information on identifiers of the first radio terminal and the second radio terminal.

5. The station according to claim 1, further comprising at least one antenna.

6. A radio terminal, comprising:
a transmitter configured to transmit a radio signal; and
a receiver configured to receive, from a radio base station, a first signal for assigning an access right to the radio terminal and a second radio terminal for transmission under a multiplexing scheme, the first signal including information on a transmission opportunity period (TXOP) and a first length, and the first length being a length of radio signals transmitted from the radio terminal and the second radio terminal under the multiplexing scheme;
a preventer configured to prevent transmission of the radio signal of the radio terminal from the transmitter upon receiving a request signal transmitted from the second radio terminal directed to the radio base station; and
a canceller configured to cancel prevention of the transmission of the radio signal of the radio terminal upon receiving the first signal from the radio base station,
wherein the transmitter is configured to transmit the radio signal of the radio terminal to the radio base station simultaneously with the radio signal of the second radio terminal within the TXOP according to the received first signal even when the transmission of the radio signal of the radio terminal is prevented according to the request signal directed to the radio base station, and
wherein transmission of the radio signal by the radio terminal ends simultaneously with transmission of the radio signal by the second radio terminal.

7. The terminal according to claim 6, wherein the first signal includes information on an address of a group to which the radio terminal and the second radio terminal belong.

8. The terminal according to claim 6, wherein the first signal includes information on identifiers of the radio terminal and the second radio terminal.

9. The terminal according to claim 6, wherein the receiver receives an ACK within the TXOP after transmitting the radio signal.

10. The terminal according to claim 6, further comprising at least one antenna.

11. A communication method, comprising:
transmitting a first signal for assigning an access right to a first radio terminal and a second radio terminal for transmission under a multiplexing scheme, the first signal including information on a transmission opportunity period (TXOP) and a first length, and the first length being a length of radio signals transmitted from the first radio terminal and the second radio terminal under the multiplexing scheme,
receiving, within the TXOP, a first radio signal from the first radio terminal and a second radio signal from the second radio terminal under the multiplexing scheme, a length of the first radio signal is the first length, and a length of the second radio signal is the first length,
wherein transmission of the first radio signal by the first radio terminal and transmission of the second radio signal by the second radio terminal simultaneously end,
wherein the second radio terminal prevents transmission of its radio signal upon receiving a request signal transmitted from the first radio terminal directed to the radio base station, and
wherein the second radio terminal cancels prevention of the transmission of its radio signal and simultaneously transmits its radio signal with the radio signals of the first radio terminal under the multiplexing scheme upon receiving the first signal even when the transmission of its radio signals is prevented according to the request signal directed to the radio base station.

12. The method according to claim 11, further comprising transmitting an ACK for the first radio terminal and the second radio terminal within the TXOP after reception of the radio signals from the first radio terminal and the second radio terminal completes.

13. The method according to claim 11, wherein the first signal includes information on identifiers of the first radio terminal and the second radio terminal.

14. A communication method, comprising:
transmitting a radio signal by a radio terminal;
receiving, from a radio base station, a first signal for assigning a access right to the radio terminal and a second radio terminal for transmission under a multiplexing scheme, the first signal including information on a transmission opportunity period (TXOP) and a first length, and the first length being a length of radio signals transmitted from the radio terminal and the second radio terminal under the multiplexing scheme;
preventing transmission of the radio signal of the radio terminal upon receiving a request signal transmitted from the second radio terminal directed to the radio base station;

cancelling prevention of the transmission of the radio signal of the radio terminal upon receiving the first signal from the radio base station; and transmitting the radio signal of the radio terminal to the radio base station simultaneously with the radio signal of the second radio terminal within the TXOP according to the received first signal even when the transmission of the radio signal of the radio terminal is prevented according to the request signal directed to the radio base station, wherein the transmitting of the radio signal by the radio terminal ends simultaneously with transmitting of the radio signal by the second radio terminal.

15. The method according to claim 14, wherein the first signal includes information on an address of a group to which the radio terminal and the second radio terminal belong.

* * * * *